(12) United States Patent
Cui

(10) Patent No.: US 11,070,343 B2
(45) Date of Patent: *Jul. 20, 2021

(54) ELECTRONIC DEVICE AND WIRELESS COMMUNICATION METHOD OF WIRELESS COMMUNICATION SYSTEM

(71) Applicant: Sony Corporation, Tokyo (JP)

(72) Inventor: Tao Cui, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/897,306

(22) Filed: Jun. 10, 2020

(65) Prior Publication Data

US 2020/0304273 A1 Sep. 24, 2020

Related U.S. Application Data

(63) Continuation of application No. 16/311,176, filed as application No. PCT/CN2017/118504 on Dec. 26, 2017, now Pat. No. 10,721,049.

(30) Foreign Application Priority Data

Jan. 12, 2017 (CN) .......................... 201710022241.X

(51) Int. Cl.
*H04W 4/00* (2018.01)
*H04L 5/00* (2006.01)
(Continued)

(52) U.S. Cl.
CPC .............. *H04L 5/0082* (2013.01); *H04L 5/00* (2013.01); *H04L 5/0044* (2013.01);
(Continued)

(58) Field of Classification Search
CPC ....... H04L 5/00; H04L 5/0082; H04L 5/0044; H04L 5/0094; H04L 25/03;
(Continued)

(56) References Cited

U.S. PATENT DOCUMENTS 10,574,502 B2 * 2/2020 Yi ........................... H04L 27/26
10,721,049 B2 * 7/2020 Cui ......................... H04L 25/03
(Continued)

FOREIGN PATENT DOCUMENTS

WO 2016/045620 A1 3/2016
WO 2016/146165 A1 9/2016
(Continued)

OTHER PUBLICATIONS

Extended European Search Report dated Dec. 17, 2019 in European Application No. 17891819.9-1231.
(Continued)

*Primary Examiner* — Thai D Hoang
(74) *Attorney, Agent, or Firm* — Xsensus LLP

(57) ABSTRACT

An electronic device includes one or a plurality of processing circuits configured to execute the following operations: adjusting the length of a symbol in a self-contained subframe under a first sub-carrier, such that within a transmission time interval (TTI) of a self-contained subframe under a second sub-carrier: the edge of each symbol of an uplink symbol and downlink symbol in a self-contained subframe under the second sub-carrier is aligned with the edge of the symbol in the self-contained subframe under the adjusted first sub-carrier; furthermore, the first symbol in the self-contained subframe under the adjusted first sub-carrier is longer than the other non-adjusted symbols in the self-contained subframe under the adjusted first sub-carrier.

20 Claims, 9 Drawing Sheets

(51) Int. Cl.
*H04W 72/04* (2009.01)
*H04L 27/26* (2006.01)
*H04L 25/03* (2006.01)

(52) U.S. Cl.
CPC ............ *H04L 5/0094* (2013.01); *H04L 25/03* (2013.01); *H04L 27/2602* (2013.01); *H04L 27/2607* (2013.01); *H04W 72/0446* (2013.01); *H04W 72/0453* (2013.01)

(58) Field of Classification Search
CPC ........... H04L 27/2602; H04L 27/2607; H04W 72/0446; H04W 72/0453
USPC ................. 370/329–330, 335–345, 347–348
See application file for complete search history.

(56) References Cited

U.S. PATENT DOCUMENTS

| | | | |
|---|---|---|---|
| 2010/0034165 A1* | 2/2010 | Han | H04L 1/1614 370/330 |
| 2014/0307603 A1* | 10/2014 | Barany | H04L 5/0055 370/311 |
| 2015/0092752 A1* | 4/2015 | Dural | H04W 74/002 370/336 |
| 2016/0020875 A1* | 1/2016 | Seo | H04W 72/042 370/280 |
| 2016/0043843 A1 | 2/2016 | Liu et al. | |
| 2016/0295636 A1* | 10/2016 | Yang | H04W 24/10 |
| 2016/0338081 A1 | 11/2016 | Jiang et al. | |
| 2016/0352551 A1* | 12/2016 | Zhang | H04L 27/2646 |
| 2017/0303215 A1* | 10/2017 | Kim | H04W 76/28 |
| 2018/0014268 A1* | 1/2018 | Kuppusamy | H04W 56/0035 |
| 2018/0091267 A1* | 3/2018 | Kim | H04L 27/2602 |
| 2018/0270851 A1* | 9/2018 | Bhattad | H04W 72/1294 |
| 2018/0302906 A1* | 10/2018 | Baldemair | H04W 72/10 |
| 2018/0316532 A1* | 11/2018 | Tie | H04L 27/2607 |
| 2019/0149383 A1* | 5/2019 | Ko | H04W 72/04 370/329 |

FOREIGN PATENT DOCUMENTS

| | | |
|---|---|---|
| WO | 2016/148878 A1 | 9/2016 |
| WO | 2018/048053 A1 | 3/2018 |

OTHER PUBLICATIONS

LG Electronics: "Discussion on alignment for different numerology multiplexing"; R1-166878 Numerology Multiplexing, 3rd Generation Partnership Project (3GPP), vol. RAN WG1, no. Gothenburg, Sweden; Aug. 22, 2016-Aug. 26, 2016 Aug. 21, 2016 (Aug. 21, 2016), XP051125615.
English language translation of International Search Report for International Application No. PCT/CN2017/118504, dated Mar. 29, 2018.

* cited by examiner

ELECTRONIC DEVICE AND WIRELESS COMMUNICATION METHOD OF WIRELESS COMMUNICATION SYSTEM

CROSS-REFERENCE TO RELATED APPLICATIONS

The present application is a continuation of U.S. application Ser. No. 16/311,176, filed Dec. 19, 2018, which is based on PCT filing PCT/CN2017/118504, filed Dec. 26, 2017, which claims priority to CN 201710022241.X, filed Jan. 12, 2017, each of which is incorporated herein by reference in its entirety.

FIELD

The present disclosure relates to the technical field of wireless communication, and in particular to an electronic device in a wireless communication system and a method for performing wireless communication in the wireless communication system.

BACKGROUND

Based on requirements on transmission environments and user services, a typical LTE (Long Term Evolution) communication system is configured with a subcarrier spacing of 15 kHz and a TTI (Transmission Time Interval) of 1 ms. However, for future 5G new air interface technologies, the single configuration of the subcarrier spacing and TTI cannot meet requirements of flexible configuration of subframes and super low-delay transmission, especially in unlicensed frequency bands which include a number of self-contained subframes. A scenario based on low delay and highly reliable connection requirements of 5G requires a round-trip air interface delay less than 1 ms, and a 5G new communication system may be implemented by flexibly utilizing different subcarrier spacings. However, when data is transmitted at different subcarrier spacings, the communication quality may be affected since different subcarrier spacings may interfere with each other during transmission due to different subframe structures of different subcarrier spacings.

Therefore, it is necessary to provide a new wireless communication solution to avoid or reduce the interference between different subcarrier spacings.

SUMMARY

This part provides an overview of the present disclosure, rather than a full scope or all features of the present disclosure.

It is an object of the present disclosure to provide an electronic device in a wireless communication system and a method for performing wireless communication in a wireless communication system, such that symbols in different subcarrier spacing scenarios can be aligned with each other, to avoid or reduce interfaces between different subcarrier spacings.

According to an aspect of the present disclosure, an electronic device in a wireless communication system is provided. The electronic device includes one or more processing circuits configured to perform operations of: adjusting a length of a symbol in a self-contained subframe on a first subcarrier so that, within one transmission time interval TTI of a self-contained subframe on a second subcarrier: boundaries of downlink symbols and uplink symbols in the self-contained subframe on the second subcarrier are aligned with boundaries of symbols in the self-contained subframe on the first subcarrier after adjustment, and as compared with unadjusted symbols in the self-contained subframe on the first subcarrier after adjustment, a first symbol in the self-contained subframe on the first subcarrier has a greater length.

According to another aspect of the present disclosure, a user equipment in a wireless communication system is provided. The user equipment includes one or more processing circuits configured to perform operations of: acquiring downlink signaling from a base station in the wireless communication system; and acquiring, from the downlink signaling, a length of a symbol in a self-contained sub-frame on a first subcarrier after adjustment, where within one transmission time interval TTI of a self-contained subframe on a second subcarrier: boundaries of downlink symbols and uplink symbols in the self-contained subframe on the second subcarrier are aligned with boundaries of the symbols in the self-contained subframe on the first subcarrier after adjustment, and as compared with unadjusted symbols in the self-contained subframe on the first subcarrier after adjustment, a first symbol in the self-contained subframe on the first subcarrier after adjustment has a greater length.

According to another aspect of the present disclosure, a wireless communication system is provided. The wireless communication system includes a base station and a user equipment. The base station includes a first transceiver, and one or more first processing circuits configured to perform operations of: adjusting a length of a symbol in a self-contained subframe on a first subcarrier so that, within one transmission time interval TTI of a self-contained subframe on a second subcarrier: boundaries of downlink symbols and uplink symbols in the self-contained subframe on the second subcarrier are aligned with boundaries of symbols in the self-contained subframe on the first subcarrier after adjustment, and as compared with unadjusted symbols in the self-contained subframe on the first subcarrier after adjustment, a first symbol in the self-contained subframe on the first subcarrier after adjustment has a greater length, and causing the first transceiver to notify lengths of symbols in the self-contained subframes on the first subcarrier after adjustment to the user equipment. The user equipment includes a second transceiver, and one or more second processing circuits configured to perform operations of: acquiring downlink signaling from the base station through the second transceiver, and acquiring, from the downlink signaling, a length of a symbol in a self-contained sub-frame on the first subcarrier after adjustment.

According to another aspect of the present disclosure, a method for performing wireless communication in a wireless communication system is provided. The method includes adjusting a length of a symbol in a self-contained subframe on a first subcarrier so that, within one transmission time interval TTI of a self-contained subframe on a second subcarrier: boundaries of downlink symbols and uplink symbols in the self-contained subframe on the second subcarrier are aligned with boundaries of symbols in the self-contained subframe on the first subcarrier after adjustment, and as compared with unadjusted symbols in the self-contained subframe on the first subcarrier after adjustment, a first symbol in the self-contained subframe on the first subcarrier after adjustment has a greater length.

According to another aspect of the present disclosure, a method for performing wireless communication in a wireless communication system is provided. The method includes acquiring downlink signaling from a base station in the wireless communication system; and acquiring, from the downlink signaling, a lengths of a symbol in a self-contained subframe on a first subcarrier after adjustment, where within one transmission time interval TTI of a self-contained subframe on a second subcarrier: boundaries of downlink symbols and uplink symbols in the self-contained subframe on the second subcarrier are aligned with boundaries of the symbols in the self-contained subframe on the first subcarrier after adjustment, and as compared with unadjusted symbols in the self-contained subframe on the first subcarrier after adjustment, a first symbol in the self-contained subframe on the first subcarrier after adjustment has a greater length.

With the electronic device in a wireless communication system and the method for performing wireless communication in the wireless communication system according to the present disclosure, a length of a symbol in a self-contained subframe on a first subcarrier can be adjusted, such that symbols on the first subcarrier can be aligned with symbols on the second subcarrier, while a first symbol in the self-contained subframe on the first subcarrier after adjustment has a greater length. In this case, interfaces between different subcarrier spacings can be avoided or reduced.

A further applicability range is apparent from the description provided herein. The description and specific examples in the overview are merely for the purpose of illustration and are not intended to limit the scope of the present disclosure.

BRIEF DESCRIPTION OF THE DRAWINGS

The drawings described herein are provided merely for the purpose of illustrating selected embodiments rather than all possible embodiments, and are not intended to limit the scope of the present disclosure. In the drawings.

Figure 1:
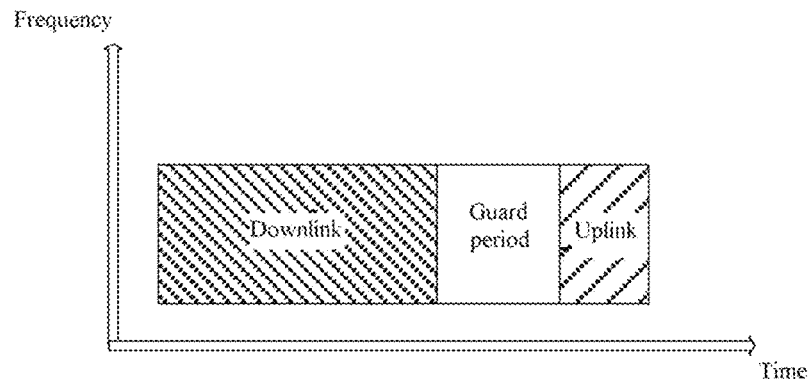
FIG. 1 is a schematic diagram showing a structure of an NR self-contained subframe according to an embodiment of the present disclosure.

While specific embodiments of the present disclosure are shown as examples in the drawings and are described herein in detail, various modifications and variations may be made to the present disclosure. It should be understood that the description for the specific embodiments herein is not intended to limit the present disclosure to the disclosed specific forms, and the present disclosure is intended to encompass all modifications, equivalents and alternatives that fall within the spirit and scope of the present disclosure. It should be noted that reference numerals indicate corresponding parts throughout the drawings.

DETAILED DESCRIPTION OF EMBODIMENTS

Examples of the present disclosure are described more fully with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Various specific details such as examples of specific parts, devices and methods are set forth to provide thorough understanding for the embodiments of the present disclosure. It is apparent to those skilled in the art that the exemplary embodiments may be embodied in many different forms without the specific details, and are not interpreted as a limit for the scope of the present disclosure. In some exemplary embodiments, well-known processes, well-known structures and well-known technologies are not described in detail.

A UE (User Equipment) in the present disclosure includes but is not limited to a terminal having a wireless communication function especially cellular communication function, such as a mobile terminal, a computer or an in-vehicle apparatus. Further, the UE in the present disclosure may also be a critical component such as a chip in a final product. In addition, a base station in the present disclosure may be, for example, an eNB (evolution Node Base Station), a gNB or an eNB, or a component such as a chip in a gNB.

In a TTI (Transmission Time Interval), a self-contained subframe introduced by 5G NR (New Radio) includes three parts: a downlink part, a guard period and an uplink part, as shown in FIG. 1.

FIG. 1 shows a structure of a NR self-contained subframe. Unlike the subframe structure design models of FDD (Frequency Division Duplexing) (uplink feedback after 10 ms) and TDD (Time Division Duplexing) (specific uplink subframe feedback) in LTE (Long Term Revolution), the 5G NR self-contained subframe is characterized in that the uplink part may feedback the downlink part in the same subframe, to meet the requirement of super low feedback delay.

For example, the downlink part may include downlink control information and a downlink data transmission and/or reference signal, and the uplink part may include uplink control information and an uplink data transmission and/or reference signal. The guard period is located between the downlink part and the uplink part, for avoiding interferences between the downlink part and the uplink part.

With enhancement of heterogeneity of communication network environments, a 5G new communication system is required to be equipped with a configurable air interface and a flexible TTI length. The above described structure of the self-contained subframe and different subcarrier spacings to be mentioned below are designed for this requirement.

Figure 2:
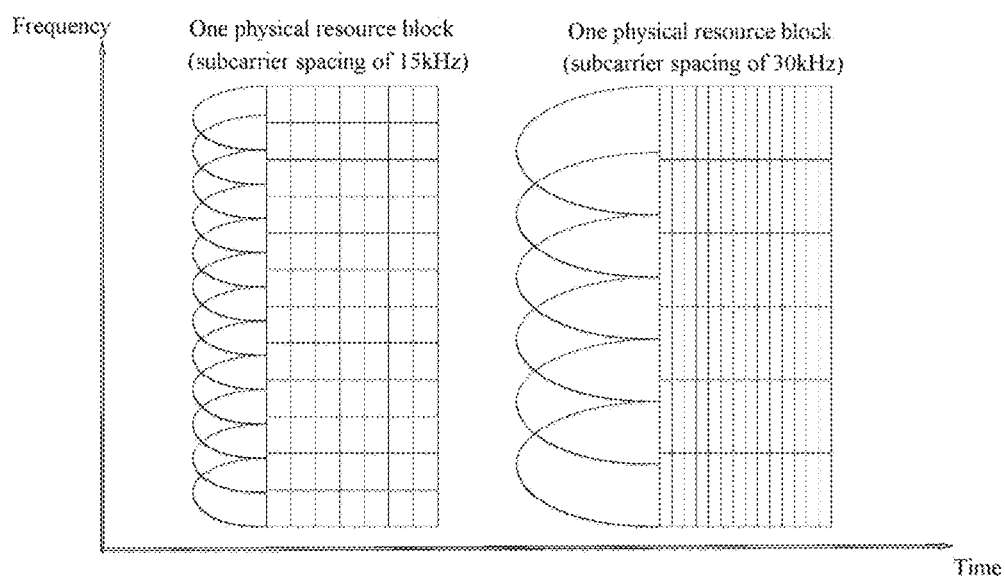
FIG. 2 is a schematic diagram showing physical resource blocks at different subcarrier spacings.

FIG. 2 shows an example of physical resource blocks at different subcarrier spacings. As shown in FIG. 2, a physical resource block at a 15 kHz subcarrier spacing is shown on the left, and a physical resource block at a 30 kHz subcarrier spacing is shown on the right. Symbols at different subcarrier spacings may be aligned by taking for example the 15 kHz scenario as an reference, while meeting a condition that subcarrier spacing Fs=15 kHZ*$2^n$ (n may be a positive or negative integer), where a length of one symbol (including CP (Cyclic Prefix)) at the 15 kHz subcarrier spacing corresponds to a sum of lengths of $2^n$ corresponding symbols at other subcarrier spacings.

Table 1 shows an example of lengths of symbols in a subframe at different subcarrier spacings.

TABLE 1

| Subcarrier Spacing Scheme | Length of Cyclic Prefix (μs) | Length of Symbol (μs) (not including CP) | Length of Symbol (μs) (including CP) |
|---|---|---|---|
| LTE (normal CP) | 5.21 (l = 0) | 66.70 | 71.91 |
|  | 4.69 (l = 1, 2, . . . , 6) |  | 71.39 |
| NR (n = 0, $F_s$ = 15 kHz) | 5.21 (l = 0) | 66.70 | 71.91 |
|  | 4.69 (l = 1, 2, . . . , 6) |  | 71.39 |
| NR (n = 1, $F_s$ = 30 kHz) | 2.60 (l = 0) | 33.35 | 35.95 |
|  | 2.34 (l = 1, 2, . . . , 6) |  | 35.69 |
| NR (n = 2, $F_s$ = 60 kHz) | 1.30 (l = 0) | 16.68 | 17.98 |
|  | 1.17 (l = 1, 2, . . . , 6) |  | 17.85 |

In Table 1, l represents an index of a symbol. As can be seen from Table 1, in a case of the existing LTE and a normal CP, the length of CP of a symbol 0 is 5.21 μs, the length of CP of each of symbols 1 to 6 is 4.69 μs, and the length of each symbol which does not include CP is 66.7 μs. In this case, there are two lengths of symbols including CP, which includes 71.91 μs of the symbol 0 and 71.39 μs of each of symbols 1 to 6.

In order to be compatible with the existing LTE, in the 5G NR system, in a case that the subcarrier spacing Fs=15 kHz, the length of CP of the symbol 0 is 5.21 μs, the length of CP of each of symbols 1 to 6 is 4.69 μs, and the length of each symbol which does not include CP is 66.70 μs. In this case, there are also two lengths of symbols including CP, which includes 71.91 μs of the symbol 0 and 71.39 μs of each of symbols 1 to 6.

Further, in a case that the subcarrier spacing Fs=30 kHz, the length of CP of the symbol 0 is 2.60 μs, the length of CP of each of symbols 1 to 6 is 2.34 μs, and the length of each symbol which does not include CP is 33.35 μs. In this case, there are also two lengths of symbols including CP, which includes 35.95 μs of the symbol 0 and 35.69 μs of each of symbols 1 to 6.

Further, in a case that the subcarrier spacing Fs=60 kHz, the length of CP of the symbol 0 is 1.30 μs, the length of CP of each of symbols 1 to 6 is 1.17 μs, and the length of each symbol which does not include CP is 16.68 μs. In this case, there are also two lengths of symbols including CP, which includes 17.98 μs of the symbol 0 and 17.85 μs of each of symbols 1 to 6.

Examples of n=0, 1 and 2 are listed in Table 1. However, n may be 3, 4 or another greater number. In addition, a case where one TTI includes only one longer CP is shown in Table 1. A case where one TTI includes more than one longer CPs is described below.

Figure 3:
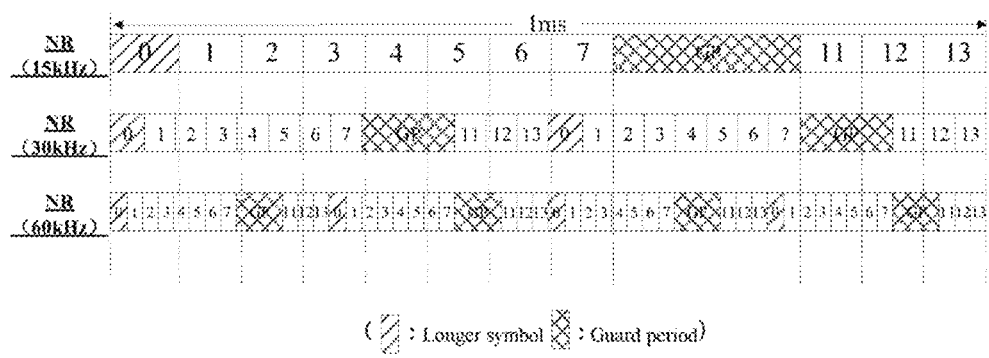
FIG. 3 is a schematic diagram showing unaligned symbols at different subcarrier spacings before adjustment.

It is assumed that the initial symbols are aligned. When some symbols or GPs (Guard Periods) are not adjusted, a normal alignment condition is as shown in FIG. 3. FIG. 3 is a schematic diagram showing unaligned symbols at different subcarrier spacings (15 kHz, 30 kHz and 60 kHZ) before adjustment.

The downlink part of a self-contained subframe in FIG. 3 includes 8 symbols, the GP part of the self-contained subframe includes 3 symbols, and the uplink part of the self-contained subframe includes 3 symbols. Here, the number of symbols included in each part is only an example, and the present disclosure is not limited thereto. Further, in the example shown in FIG. 3, the TTI at the subcarrier spacing of 15 kHz is 1 ms.

Since there is a symbol including a longer CP (the symbol 0), it cannot be guaranteed that boundaries of all symbols in one TTI are exactly aligned. As shown in FIG. 3, the length of one symbol at the subcarrier spacing of 15 kHz may be greater than a sum of lengths of 2 symbols at the subcarrier spacing of 30 kHz, or greater than a sum of lengths of 4 symbols at the subcarrier spacing of 60 kHz.

Therefore, measures are required to avoid interferences between symbols due to non-orthogonal subcarriers resulted from unaligned symbols. The case shown in FIG. 3 is taken as an example, measures are required such that the boundaries of downlink symbols and uplink symbols in the self-contained subframe at the subcarrier spacing of 15 kHz are aligned with the boundaries of symbols in the self-contained subframe at the subcarrier spacing of 30 kHz or 60 kHz. It is to be noted that, alignment configuration may be performed at a period of 1 ms, that is, the same alignment manner is adopted in each millisecond.

Figure 4:
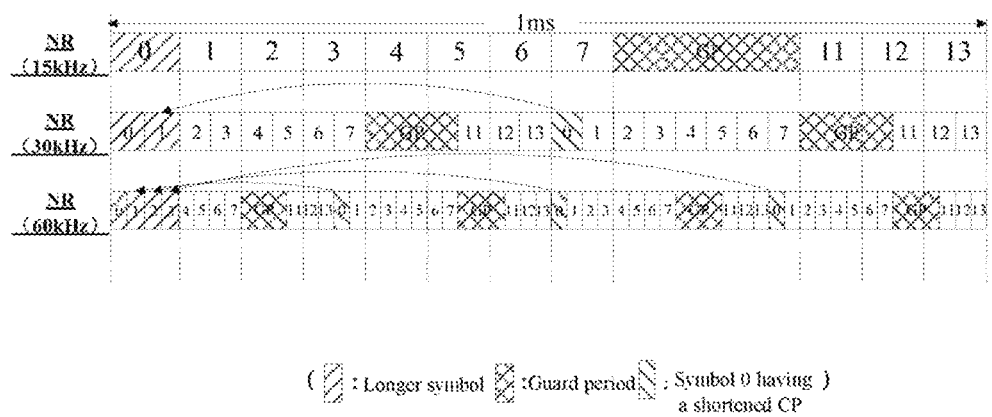
FIG. 4 is a schematic diagram showing aligned symbols at different subcarrier spacings after adjustment.

The boundaries are not exactly aligned due to one or more shorter symbols immediately adjacent to the symbol 0. Therefore, in order to facilitate management, the length of only a symbol adjacent to the symbol 0 is adjusted, such that boundaries of other symbols are exactly aligned. For example, FIG. 4 is a schematic diagram showing aligned symbols at different subcarrier spacings (15 kHz, 30 kHz and 60 kHZ) after adjustment. In FIG. 4, the problem of alignment between symbols can be solved by simply adjusting the position of the symbol 0, that is, the longer symbol in each subframe is moved to the forefront part of the first subframe. However, the first symbol (the symbol 0) in each TTI which includes a longer CP carries a lot of control information, and the longer CP functions to protect the symbol 0 from interferences between symbols. Therefore, the longer CP takes a vital role during transmission of data in the whole subframe.

As shown in FIG. 4, after adjustment, the symbol 0 in the second subframe at the subcarrier spacing of 30 kHz has a shortened CP, and the symbol 0 in each of the second, third and fourth subframe at the subcarrier spacing of 60 kHz has a shortened CP. This result is undesired.

Figure 5:
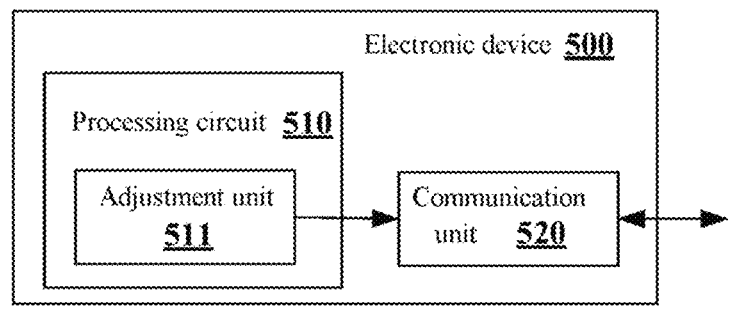
FIG. 5 is a block diagram showing a structure of an electronic device in a wireless communication system according to an embodiment of the present disclosure.

In order to effectively align symbols in different subcarrier spacing scenarios to reduce interferences between symbols, the technical solution according to the present disclosure is provided. FIG. 5 illustrates a structure of an electronic device 500 in a wireless communication system according to an embodiment of the present disclosure.

As shown in FIG. 5, the electronic device 500 may include a processing circuit 510. It should be noted that the electronic device 500 may include one processing circuit 510 or multiple processing circuits 510. The electronic device 500 may further include a communication unit 520.

Further, the processing circuit 510 may include various discrete functional units to perform various different functions and/or operations. It should be noted that the functional units may be physical entities or logical entities, and units referred to by different names may be implemented as a same physical entity.

For example, as shown in FIG. 5, the processing circuit 510 may include an adjustment unit 511.

The adjustment unit 511 may adjust a length of a symbol in a self-contained subframe on a first subcarrier so that, within one transmission time interval TTI of a self-contained subframe on a second subcarrier: boundaries of downlink symbols and uplink symbols in the self-contained subframe on the second subcarrier are aligned with boundaries of symbols in self-contained subframes on the first subcarrier after adjustment, and as compared with unadjusted symbols in the self-contained subframe on the first subcarrier after adjustment, a first symbol in the self-contained subframe on the first subcarrier after adjustment has a greater length.

With the electronic device 500 according to an embodiment of the present disclosure, the length of the symbol in the self-contained subframe on the first subcarrier may be adjusted, such that symbols on the first subcarrier are aligned with symbols on the second subcarrier, while maintaining the greater length of the first symbol in the self-contained subframe on the first subcarrier after adjustment. In this way, interferences between different subcarriers can be effectively avoided or reduced.

According to a preferred embodiment of the present disclosure, the adjustment unit 511 may adjust the length of the symbol in the self-contained subframe on the first subcarrier by increasing or decreasing a length of a CP of the symbol in the self-contained subframe on the first subcarrier.

More preferably, the adjustment unit 511 may adjust a length of a symbol which is adjacent to the first symbol in the self-contained subframe on the first subcarrier.

According to an embodiment of the present disclosure, before the adjustment unit 511 adjusts the length of the symbol in the self-contained subframe on the first subcarrier, the first symbol in the self-contained subframe on the first subcarrier has a first length, symbols other than the first symbol in the self-contained subframes on the first subcarrier have a second length, and the first length is greater than the second length.

Figure 6:
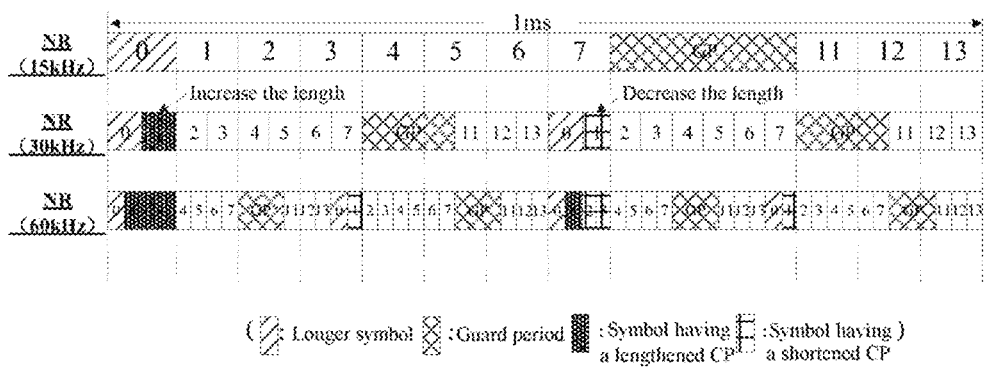
FIG. 6 is a schematic diagram showing aligned symbols at different subcarrier spacings after adjustment.

FIG. 6 is a schematic diagram showing aligned symbols at different subcarrier spacings after adjustment. In the following, an embodiment of the present disclosure is described in conjunction with FIG. 6.

As shown in FIG. 6, the adjustment unit 511 may adjust lengths of symbols in self-contained subframes at subcarrier spacings of 30 kHz and 60 kHz (corresponding to a first subcarrier). After adjustment, in a TTI (which is 1 ms) of a self-contained subframe at a subcarrier spacing of 15 kHz (corresponding to a second subcarrier), boundaries of downlink symbols (including symbols 0 to 7) and uplink symbols (including symbols 11 to 13) in the self-contained subframe at the subcarrier spacing of 15 kHz are aligned with boundaries of symbols in self-contained subframes at the subcarrier spacings of 30 kHz and 60 kHz after adjustment. In addition, as compared with unadjusted symbols in the self-contained subframes at the subcarrier spacings of 30 kHz and 60 kHz after adjustment, adjusted first symbols (symbols 0) in the self-contained subframes at the subcarrier spacings of 30 kHa and 60 kHz have a greater length.

FIG. 3 may be considered as a schematic diagram corresponding to FIG. 6, which shows unaligned symbols at different subcarrier spacings (15 kHz, 30 kHz and 60 kHz) before adjustment. Further, Table 1 may be considered as a specific example corresponding to FIG. 3, which shows lengths of symbols at different subcarrier spacings (15 kHz, 30 kHz and 60 kHz) before adjustment. In this case, before the adjustment unit 511 adjusts the length of a symbol in a self-contained subframe at the subcarrier spacing of 30 Hz, symbols 0 in the self-contained subframes at the subcarrier spacing of 30 Hz have a first length 35.95 µs, and each of other symbols such as symbols 1 to 13 in the self-contained subframes at the subcarrier spacing of 30 Hz has a second length 35.69 µs, where the first length is greater than the second length. Further, before the adjustment unit 511 adjusts the length of a symbol in a self-contained subframe at the subcarrier spacing of 60 Hz, symbols 0 in the self-contained subframes at the subcarrier spacing of 60 Hz have a first length 17.98 µs, and each of other symbols such as symbols 1 to 13 in the self-contained subframes at the subcarrier spacing of 60 Hz has a second length 17.85 µs, where the first length is greater than the second length.

As shown in FIG. 6, the adjustment unit 511 may adjusts lengths of symbols in self-contained subframes at the subcarrier spacings of 30 Hz and 60 Hz by increasing or decreasing the lengths of CPs of the symbols. For example, the adjustment unit 511 may adjust lengths of symbols adjacent to symbols 0 in self-contained subframes at the subcarrier spacings of 30 Hz and 60 Hz.

For example, at the subcarrier spacing of 30 Hz, the adjustment unit 511 may increase the length of a symbol 1 in a first subframe, and decrease the length of a symbol 1 in a second subframe. Referring to Table 1, in a case that the length of the symbol 1 in the first subframe is increased by 0.26 µs, and the length of the symbol 1 in the second subframe is decreased by 0.26 µs, boundaries of downlink symbols (including symbols 0 to 7) and uplink symbols (including symbols 11 to 13) in the self-contained subframe at the subcarrier spacing of 15 Hz are aligned with boundaries of symbols in self-contained subframes at the subcarrier spacing of 30 Hz after adjustment.

At the subcarrier spacing of 60 Hz, the adjustment unit 511 may increase the lengths of symbols 1, 2 and 3 in a first subframe, decrease the length of a symbol 1 in a second subframe, increase the length of a symbol 1 in a third subframe, decrease the lengths of symbols 2 and 3 in a third subframe, and decrease the length of a symbol 1 in a fourth subframe. Referring to Table 1, it can be deduced that lengths of the symbols are increased or decreased by about 0.13 µs. After the above adjustment, boundaries of downlink symbols (including symbols 0 to 7) and uplink symbols (including symbols 11 to 13) in the self-contained subframe at the subcarrier spacing of 15 Hz are aligned with boundaries of symbols in self-contained subframes at the subcarrier spacing of 60 Hz after adjustment.

As described above, according to the technical solution of the present disclosure, boundaries of symbols are not aligned by reducing the lengths of symbols 0 in some TTIs at the subcarrier spacing of 30 Hz or 60 Hz. Instead, the problem of unaligned boundaries of symbols due to the longer symbol 0 is compensated by properly adjusting the length of the symbol adjacent to the symbol 0 (where a symbol 1 is adjusted at the subcarrier spacing of 30 Hz, and symbols 1 to 3 are adjusted at the subcarrier spacing of 60 Hz). Therefore, interferences between different subcarrier spacings can be effectively avoided or reduced with the technical solution of the present disclosure.

In the above, only subcarrier spacings of 15 kHz, 30 kHz and 60 Hz are taken as an example for description, but the present disclosure is not limited thereto. For example, the adjustment unit 511 may perform similar operations if other different subcarrier spacings are adopted, to align symbols between the first subcarrier and the second subcarrier, while ensuring that the first symbols in the self-contained subframes on the first subcarrier has a greater length after adjustment.

In FIG. 6, for different subcarrier spacings, the length of one or multiple symbols (where one symbol corresponding to the scenario of 30 kHz, and multiple symbols corresponding to the scenario of 60 kHz) adjacent to the symbol 0 are adjusted such that boundaries of all symbols are aligned, while ensuring that the CP of the symbol 0 is the longest among CPs of symbols in each TTI. For scenarios of different subcarrier spacings, it can be deduced that the number of symbols of which the lengths are to be adjusted is $(2^n-1)$, where n satisfies $Fs=15 kHz*2^n$. This alignment imposes a high requirement on the scheduling timing of the electronic device according to the present disclosure, and requires a more elaborate scheduling strategy.

According to a preferred embodiment of the present disclosure, the adjustment unit 511 may adjust a length of only a second symbol in the self-contained subframe on the first subcarrier, and further insert a guard period in a self-contained subframe on the first subcarrier. Here, the inserted guard period is different from the guard period between the downlink part and the uplink part mentioned above.

Figure 7:
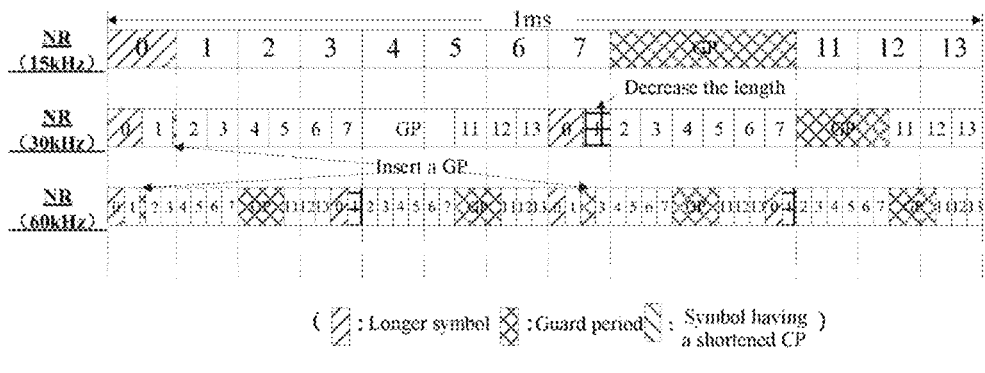
FIG. 7 is a schematic diagram showing aligned symbols at different subcarrier spacings after adjustment.

FIG. 7 is a schematic diagram showing aligned symbols at different subcarrier spacings after adjustment according to another embodiment of the present disclosure. Another embodiment of the present disclosure is described in conjunction with FIG. 7.

A shown in FIG. 7, the adjustment unit 511 may adjust lengths of symbols 1 in self-contained subframes at subcarrier spacings of 30 kHz and 60 Hz, and further insert guard periods in self-contained subframes at subcarrier spacings of 30 kHz and 60 Hz, so as to align boundaries.

For example, at the subcarrier spacing of 30 kHz, the adjustment unit 511 may insert a guard period after a symbol 1 in a first subframe, and decrease the length of a symbol 1 in a second subframe. Referring to Table 1, when a guard period of about 0.26 μs is inserted after the symbol 1 in the first subframe, and the length of the symbol 1 in the second subframe is decreased by about 0.26 μs, boundaries of downlink symbols (including symbols 0 to 7) and uplink symbols (including symbols 11 to 13) in the self-contained subframe at the subcarrier spacing of 15 Hz are aligned with boundaries of symbols in self-contained subframes at the subcarrier spacing of 30 Hz after adjustment.

At the subcarrier spacing of 60 kHz, the adjustment unit 511 may insert guard periods after a symbol 1 in a first subframe and a symbol 1 in a third subframe, and decrease the lengths of a symbol 1 in a second subframe and a symbol 1 in a fourth subframe. Referring to Table 1, it may be deduced that the guard period inserted after the symbol 1 in the first subframe has a length of about 0.38 μs, the guard period inserted after the symbol 1 in the third subframe has a length of about 17.71 μs, and a symbol 2 in the third subframe is replaced by the inserted guard period. In addition, it may be deduced that the length of each of the symbol 1 in the second subframe and the symbol 1 in the fourth subframe is decreased by about 0.14 μs. After the above adjustment, boundaries of downlink symbols (including symbols 0 to 7) and uplink symbols (including symbols 11 to 13) in the self-contained subframe at the subcarrier spacing of 15 Hz are aligned with boundaries of symbols in self-contained subframes at the subcarrier spacing of 60 Hz after adjustment.

In a case of a large subcarrier spacing, with the above adjustment manner, the amount of symbols of which the lengths are to be adjusted is small. Instead, short guard periods GP are inserted at some positions and lengths of a small number of symbols 1 are adjusted to align boundaries of symbols. Since the guard periods are inserted temporarily, the length of each inserted GP is less than that of a standard symbol. Symbols at different subcarrier spacings are aligned likewise, while overhead regarding time and scheduling caused by adjusting lengths of a great number of symbols can be effectively reduced since the inserted guard periods protect symbols which may be subject to interferences.

In the above, a case where one TTI includes only one longer CP is described. A case where one TTI includes two long CPs is described below.

In order to assure the forward compatibility of the LTE, a scenario where one TTI includes two symbols having a longer CP needs to be considered. The scenario is similar to the construction of an existing LTE special subframe. Table 2 shows an example of lengths of symbols included in a subframe at different subcarrier spacings in this scenario.

TABLE 2

| Subcarrier Spacing Scheme | Length of Cyclic Prefix (μs) | Length of Symbol (μs) (not including CP) | Length of Symbol (μs) (including CP) |
|---|---|---|---|
| LTE (normal CP) | 5.21 (l = 0) | 66.67 | 71.88 |
| | 4.69 (l = 1, 2, . . . , 6) | | 71.35 |
| NR (n = 0, $F_s$ = 15 kHz) | 5.21 (l = 0) | 66.67 | 71.88 |
| | 4.69 (l = 1, 2, . . . , 6) | | 71.35 |
| NR (n = 1, $F_s$ = 30 kHz) | 2.60 (l = 0) | 33.33 | 35.94 |
| | 2.34 (l = 1, 2, . . . , 6) | | 35.68 |
| NR (n = 2, $F_s$ = 60 kHz) | 1.30 (l = 0) | 16.67 | 17.97 |
| | 1.17 (l = 1, 2, . . . , 6) | | 17.84 |

In Table 2, l represents an index of a symbol. As can be seen from Table 2, in a case of the existing LTE and normal CP, the length of CP of a symbol 0 is 5.21 μs, the length of CP of each of symbols 1 to 6 is 4.69 μs, and the length of each symbol which does not include CP is 66.67 μs. In this case, there are two lengths of symbols including CP, which includes 71.88 μs of the symbol 0 and 71.35 μs of each of symbols 1-6.

In order to be compatible with the existing LTE, in the 5G NR system, in a case that the subcarrier spacing Fs=15 kHz, the length of CP of the symbol 0 is 5.21 μs, the length of CP of each of symbols 1 to 6 is 4.69 μs, and the length of each symbol which does not include CP is 66.67 μs. In this case, there are also two lengths of symbols including CP, which includes 71.88 μs of the symbol 0 and 71.35 μs of each of symbols 1-6.

Further, in a case that the subcarrier spacing Fs=30 kHz, the length of CP of the symbol 0 is 2.60 μs, the length of CP of each of symbols 1 to 6 is 2.34 μs, and the length of each symbol which does not include CP is 33.33 μs. In this case, there are also two lengths of symbols including CP, which includes 35.94 μs of the symbol 0 and 35.68 μs of each of symbols 1-6.

Further, in a case that the subcarrier spacing Fs=60 kHz, the length of CP of the symbol 0 is 1.30 μs, the length of CP of each of symbols 1 to 6 is 1.17 μs, and the length of each symbol which does not include CP is 16.67 μs. In this case, there are also two lengths of symbols including CP, which includes 17.97 μs of the symbol 0 and 17.84 μs of each of symbols 1-6.

Examples of n=0, 1 and 2 are listed in Table 2. However, n may be 3, 4 or another greater number.

It is to be noted that, a first symbol which includes a longer CP is the symbol 0, a second longer CP is located in the guard period GP (if GP occupies only one symbol, this symbol is the symbol including the longer CP; if GP occupies multiple symbols, one of the multiple symbols is the symbol including the longer CP). The length of the GP is no longer an integer multiple of a normal symbol due to the included symbol having the longer CP. Therefore, as compared with the scenario shown in FIG. 3 where one TTI includes one symbol having a longer CP, the number of symbols that cannot be exactly aligned within 1 ms is significantly increased.

Figure 8:
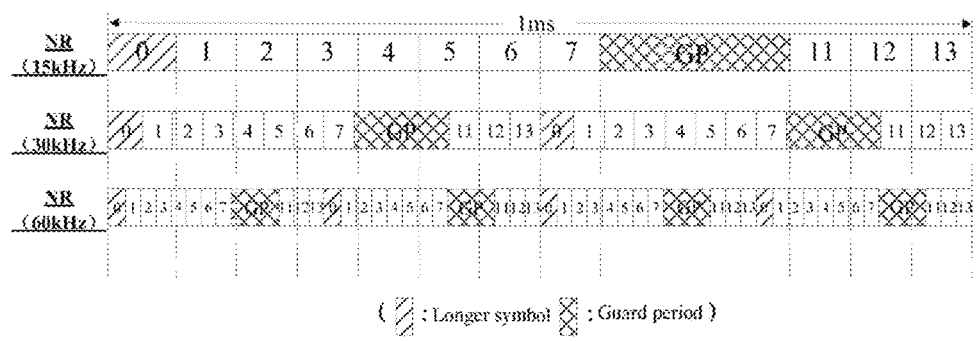
FIG. 8 is a schematic diagram showing unaligned symbols at different subcarrier spacings before adjustment.

It is assumed that the initial symbols are aligned. When some symbols or GPs are not adjusted, a normal alignment condition is as shown in FIG. 8. FIG. 8 is a schematic diagram showing unaligned symbols at different subcarrier spacings (15 kHz, 30 kHz and 60 kHZ) before adjustment in the scenario where one TTI includes two symbols having a longer CP.

According to an embodiment of the present disclosure, before the adjustment unit 511 adjusts the length of the symbol in the self-contained subframe on the first subcarrier, first symbol in the self-contained subframe on the first subcarrier and a symbol in a guard period have a first length, symbols other than the first symbol in the self-contained subframe on the first subcarrier have a second length, and the first length is greater than the second length.

According to an embodiment of the present disclosure, the adjustment unit 511 may adjust the length of the symbol which is adjacent to the first symbol in the self-contained subframe on the first subcarrier, further insert a guard period in a self-contained subframe on the first subcarrier, and further adjust a length of a guard period in a self-contained subframe on the first subcarrier, in order to align boundaries.

Figure 9:
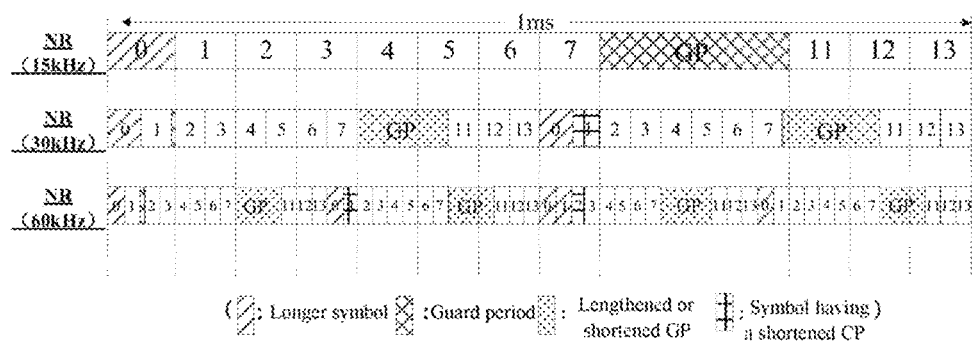
FIG. 9 is a schematic diagram showing aligned symbols at different subcarrier spacings after adjustment.

FIG. 9 is a schematic diagram showing aligned symbols at different subcarrier spacings after adjustment in the scenario where one TTI includes two symbols having a longer CP. In the following, an embodiment of the present disclosure is described in conjunction with FIG. 9.

FIG. 8 may be considered as a schematic diagram corresponding to FIG. 9, which shows unaligned symbols at different subcarrier spacings (15 kHz, 30 kHz and 60 kHz) before adjustment. Further, Table 2 may be considered as a specific example corresponding to FIG. 8, which shows lengths of symbols at different subcarrier spacings (15 kHz, 30 kHz and 60 kHz) before adjustment. In this case, before the adjustment unit 511 adjusts lengths of symbols in self-contained subframes at the subcarrier spacing of 30 Hz, symbol 0 in self-contained subframe and one symbol in guard period at the subcarrier spacing of 30 Hz have a first length 35.94 µs, and each of other symbols has a second length 35.68 µs, where the first length is greater than the second length. Further, before the adjustment unit 511 adjusts lengths of symbols in self-contained subframes at the subcarrier spacing of 60 Hz, symbol 0 in the self-contained subframe and one symbol in guard period at the subcarrier spacing of 60 Hz have a first length 17.97 µs, and each of other symbols has a second length 17.84 µs, where the first length is greater than the second length.

As shown in FIG. 9, the adjustment unit 511 may adjust lengths of symbols adjacent to the first symbols (the symbols 0) in the self-contained subframes at the subcarrier spacings of 30 kHz and 60 Hz (corresponding to the first subcarrier), further insert guard periods in the self-contained subframes at the subcarrier spacing of 30 kHz or 60 Hz, and further adjust the lengths of guard periods in self-contained subframes at the subcarrier spacing of 30 kHz or 60 Hz. After adjustment, in a TTI (which is 1 ms) of a self-contained subframe at a subcarrier spacing of 15 kHz (corresponding to a second subcarrier), boundaries of downlink symbols (including symbols 0 to 7) and uplink symbols (including symbols 11 to 13) in the self-contained subframe at the subcarrier spacing of 15 kHz are aligned with boundaries of symbols in self-contained subframes at the subcarrier spacings of 30 kHa and 60 kHz after adjustment. In addition, as compared with unadjusted symbols in the self-contained subframes at the subcarrier spacings of 30 kHz and 60 kHz after adjustment, adjusted first symbols (symbols 0) in the self-contained subframes at the subcarrier spacings of 30 kHa and 60 kHz after adjustment have a greater length.

For example, at the subcarrier spacing of 30 kHz, the adjustment unit 511 may insert a guard period after a symbol 1 in a first subframe, decrease the length of a symbol 1 in a second subframe, and increase or decrease the length of the guard period GP. Referring to Table 2, it may be deduced that a guard period of about 0.26 µs is inserted after the symbol 1 in the first subframe, the length of the symbol 1 in the second subframe is decreased by about 0.26 µs, the length of the GP in the first subframe is decreased by 0.26 µs, the length of the GP in the second subframe is increased by about 0.26 µs. After the above adjustment, boundaries of downlink symbols (including symbols 0 to 7) and uplink symbols (including symbols 11 to 13) in the self-contained subframe at the subcarrier spacing of 15 Hz are aligned with boundaries of symbols in self-contained subframes at the subcarrier spacing of 30 Hz after adjustment.

At the subcarrier spacing of 60 kHz, the adjustment unit 511 may insert guard periods after a symbol 1 in a first subframe and a symbol 1 in a third subframe, decrease the length of a symbol 1 in a second subframe, and increase or decrease the length of the guard period GP. Referring to Table 2, it may be deduced that the guard period inserted after the symbol 1 in the first subframe has a length of about 0.39 µs, the guard period inserted after the symbol 1 in the third subframe has a length of about 17.7 µs, and a symbol 2 in the third subframe is replaced by the inserted guard period. In addition, it may be deduced that the length of the symbol 1 in the second subframe is decreased by about 0.14 µs. Further, it may be deduced that the length of the GP in the first subframe is decreased by 0.14 µs, the length of GP in the second subframe is decreased by 0.14 µs, the length of the GP in the third subframe is increased by 0.24 µs, and the length of the GP in the fourth subframe is decreased by 0.14 µs. After the above adjustment, boundaries of downlink symbols (including symbols 0 to 7) and uplink symbols (including symbols 11 to 13) in the self-contained subframe at the subcarrier spacing of 15 Hz are aligned with boundaries of symbols in self-contained subframes at the subcarrier spacing of 60 Hz after adjustment.

As described above, based on the concept of aligning symbols by changing lengths of as few downlink symbols or uplink symbols for data transmission as possible, in the scenario where one TTI includes two symbols having a longer CP, symbols can be exactly aligned by changing the length of the symbol 1, inserting a short GP while adjusting the length of the existing GP. For the scenario of the subcarrier spacings of 30 kHz and 60 kHz, the original length of the GP needs to be increased or decreased as required. In addition, due to adjustment of the length of the GP, the length of symbols in the GP is no long a sum of one or multiple standard symbols. Further, some GPs of which the lengths are changed no longer include symbols having a longer CP. For example, the GP in the first subframe at the subcarrier spacing of 30 kHZ includes only three symbols of standard lengths. In fact, after adjusting GP, it cannot be guaranteed that one TTI includes two longer symbols. However, since the length of the symbol in GP does not influence data transmission, this symbol alignment manner is feasible. In addition, as compared with adjusting the length of the symbol for transmitting data, the system complexity can be significantly reduced by properly adjusting GP.

According to an embodiment of the present disclosure, the adjustment unit 511 may perform the above operation on licensed or unlicensed frequency bands.

Further, as can be seen from the above, according to the embodiment of the present disclosure, the self-contained subframe on the first subcarrier and the self-contained subframe on the second subcarrier may have the same structure. For example, the self-contained subframe on the first subcarrier and the self-contained subframe on the second subcarrier may include the same number of symbols, and the length of the first symbol is greater than that of other symbols.

Further, as can be seen from the above, according to the embodiment of the present disclosure, each of the self-contained subframe on the first subcarrier and the self-contained subframe on the second subcarrier may include a downlink part, and an uplink part and a guard period between the downlink part and the uplink part.

In addition, according to the embodiment of the present disclosure, symbols in the downlink part and the uplink part may be OFDM (Orthogonal Frequency Division Multiplexing) symbols.

Further, as can be seen from the above, according to the embodiment of the present disclosure, a subcarrier spacing of the first subcarrier is $2^n$ times as long as a subcarrier spacing of the second subcarrier, where n is a natural number. The boundary of each symbol of the downlink symbols and the uplink symbols in the self-contained subframe on the second subcarrier is aligned with the boundary of $2^n$ symbols in the self-contained subframe on the first subcarrier.

It should be noted that, according to the embodiment of the present disclosure, the above wireless communication system may be a 5G NR system, the electronic device 500 may be one of a base station and a user equipment, and the electronic device 500 may further include a communication unit 520 such as a transceiver. The communication unit 520 may wirelessly communicate with the other one of the base station and the user equipment.

In a case that the electronic device is the base station, a user equipment corresponding to the electronic device 500 may be further provided according to the present disclosure.

According to an embodiment of the present disclosure, the user equipment may include a processing circuit. It is to be noted that, the user equipment may include one or more processing circuits. In addition, the user equipment may further include a communication unit such as a transceiver.

As mentioned above, similarly, the processing circuit may include various discrete functional units to perform various different functions and/or operations. The functional units may be physical entities or logical entities, and units referred to by different names may be implemented as a same physical entity.

For example, the first acquisition unit in the processing circuit may acquire a downlink signal from a base station in the wireless communication system.

Further, the second acquisition unit in the processing circuit may acquire lengths of symbols in self-contained subframes on a first subcarrier after adjustment. In one TTI of a self-contained subframe on the second subcarrier, boundaries of downlink symbols and uplink symbols in the self-contained subframe on the second subcarrier are aligned with boundaries of the symbols in the self-contained subframes on the first subcarrier after adjustment, and as compared with unadjusted symbols in the self-contained subframe on the first subcarrier after adjustment, a first symbol in the self-contained subframe on the first subcarrier after adjustment has a greater length.

Correspondingly, a wireless communication system including a base station and a user equipment may be provided according to the present disclosure. The base station may include a first transceiver, and one or more first processing circuits. The first processing circuits are configured to perform the following operations: adjusting a length of a symbol in a self-contained subframe on a first subcarrier so that, within one transmission time interval TTI of a self-contained subframe on a second subcarrier: boundaries of downlink symbols and uplink symbols in the self-contained subframe on the second subcarrier are aligned with boundaries of symbols in self-contained subframes on the first subcarrier after adjustment, and as compared with unadjusted symbols in the self-contained subframe on the first subcarrier after adjustment, a first symbol in the self-contained subframe on the first subcarrier after adjustment has a greater length; and causing the first transceiver to notify lengths of symbols in the self-contained subframes on the first subcarrier after adjustment to the user equipment. The user equipment may include: a second transceiver and one or more second processing circuit. The second processing circuit is configured to perform operations of: acquiring, through the second transceiver, downlink signaling from the base station; and acquiring, through the second transceiver, lengths of symbols in self-contained subframes on a first subcarrier after adjustment from the downlink signaling.

In the above, an electronic device in a wireless communication system according to an embodiment of the present disclosure is described in conjunction with the drawings. A method for performing wireless communication in a wireless communication system according to an embodiment of the present disclosure is described below.

A method for performing wireless communication in a wireless communication system according to an embodiment of the present disclosure may include the steps of: adjusting a length of a symbol in a self-contained subframe on a first subcarrier so that, within one transmission time interval TTI of a self-contained subframe on a second subcarrier: boundaries of downlink symbols and uplink symbols in the self-contained subframe on the second subcarrier are aligned with boundaries of symbols in self-contained subframes on the first subcarrier after adjustment, and as compared with unadjusted symbols in the self-contained subframe on the first subcarrier after adjustment, a first symbol in the self-contained subframe on the first subcarrier after adjustment has a greater length.

Preferably, the method may include adjusting the length of the symbol in the self-contained subframe on the first subcarrier by increasing or decreasing a length of a cyclic prefix CP of the symbol in the self-contained subframe on the first subcarrier.

Preferably, the method may include adjusting a length of a symbol which is adjacent to the first symbol in the self-contained subframe on the first subcarrier.

Preferably, before adjusting the length of the symbol in the self-contained subframe on the first subcarrier, first symbols in the self-contained subframes on the first subcarrier have a first length, symbols other than the first symbols in the self-contained subframes on the first subcarrier have a second length, and the first length is greater than the second length.

Preferably, the method may include adjusting a length of only a second symbol in the self-contained subframe on the first subcarrier, and further insert a guard period in a self-contained subframe on the first subcarrier.

Preferably, before adjusting the length of the symbol in the self-contained subframe on the first subcarrier, first symbols in the self-contained subframes on the first subcarrier and a symbol in a guard period have a first length, symbols other than the first symbols in the self-contained subframes on the first subcarrier have a second length, and the first length is greater than the second length.

Preferably, the method may include adjusting the length of the symbol which is adjacent to the first symbol in the self-contained subframe on the first subcarrier, further insert a guard period in a self-contained subframe on the first subcarrier, and further adjust a length of a guard period in a self-contained subframe on the first subcarrier.

Preferably, the method may include performing the operations in an unlicensed band or a licensed band.

Preferably, the self-contained subframe on the first subcarrier and the self-contained subframe on the second subcarrier have the same structure.

Preferably, each of the self-contained subframe on the first subcarrier and the self-contained subframe on the second subcarrier includes a downlink part, an uplink part, and a guard period between the downlink part and the uplink part.

Preferably, symbols in the downlink part and the uplink part are orthogonal frequency division multiplexing OFDM symbols.

Preferably, a subcarrier spacing of the first subcarrier is $2^n$ times as long as a subcarrier spacing of the second subcarrier, where n is a natural number, and the boundary of each symbol of the downlink symbols and the uplink symbols in the self-contained subframe on the second subcarrier is aligned with the boundary of $2^n$ symbols in the self-contained subframes on the first subcarrier after adjustment.

In another aspect, a method for performing wireless communication in a wireless communication system according to another embodiment of the present disclosure includes: acquiring downlink signaling from a base station in the wireless communication system; and acquiring, from the downlink signaling, lengths of symbols in self-contained sub-frames on a first subcarrier after adjustment, where within one transmission time interval TTI of a self-contained subframe on a second subcarrier: boundaries of downlink symbols and uplink symbols in the self-contained subframe on the second subcarrier are aligned with boundaries of the symbols in the self-contained subframes on the first subcarrier after adjustment, and as compared with unadjusted symbols in the self-contained subframe on the first subcarrier after adjustment, a first symbol in the self-contained subframe on the first subcarrier after adjustment has a greater length.

Various implementations of the above-described steps of a method for performing wireless communication in a wireless communication system according to the embodiment of the present disclosure are described above in detail, and are not repeated herein.

The electronic device in a wireless communication system and a method for performing wireless communication in a wireless communication system may be applied to an unlicensed band or a licensed band, and is preferably adapted to a licensed band and/or an unlicensed band for assisted access or independent access in a 5G NR communication system architecture.

The technology according to the present disclosure can be applied to various types of products. For example, the base station mentioned in the present disclosure may be implemented as any type of base stations, for example, a gNB or an evolution Node B (eNB) proposed in a NR communication system, such as a macro eNB and a small eNB. The small eNB may be an eNB covering a cell smaller than a macro cell, such as a pico eNB, a micro eNB or a home (femto) eNB. Alternatively, the base station may be implemented as any other type of base station, such as a NodeB and a base transceiver station (BTS). The base station may include: a main body (also referred to as a base station apparatus) configured to control wireless communication; and one or more remote radio heads (RRH) arranged at positions different from the main body. In addition, various types of terminals described below may operate as a base station by performing functions of the base station temporarily or in a semi-persistent manner.

For example, the UE mentioned in the present disclosure may be implemented as a mobile terminal (such as a smartphone, a tablet personal computer (PC), a notebook PC, a portable game terminal, a portable/dongle mobile router and a digital camera device) or an in-vehicle terminal (such as a car navigation apparatus). The UE may also be implemented as a terminal (also referred to as a machine-type communication (MTC) terminal) performing machine to machine (M2M) communication. In addition, the UE may be a wireless communication module (such as an integrated circuit module including a single chip) installed on each of the above terminals.

Figure 10:
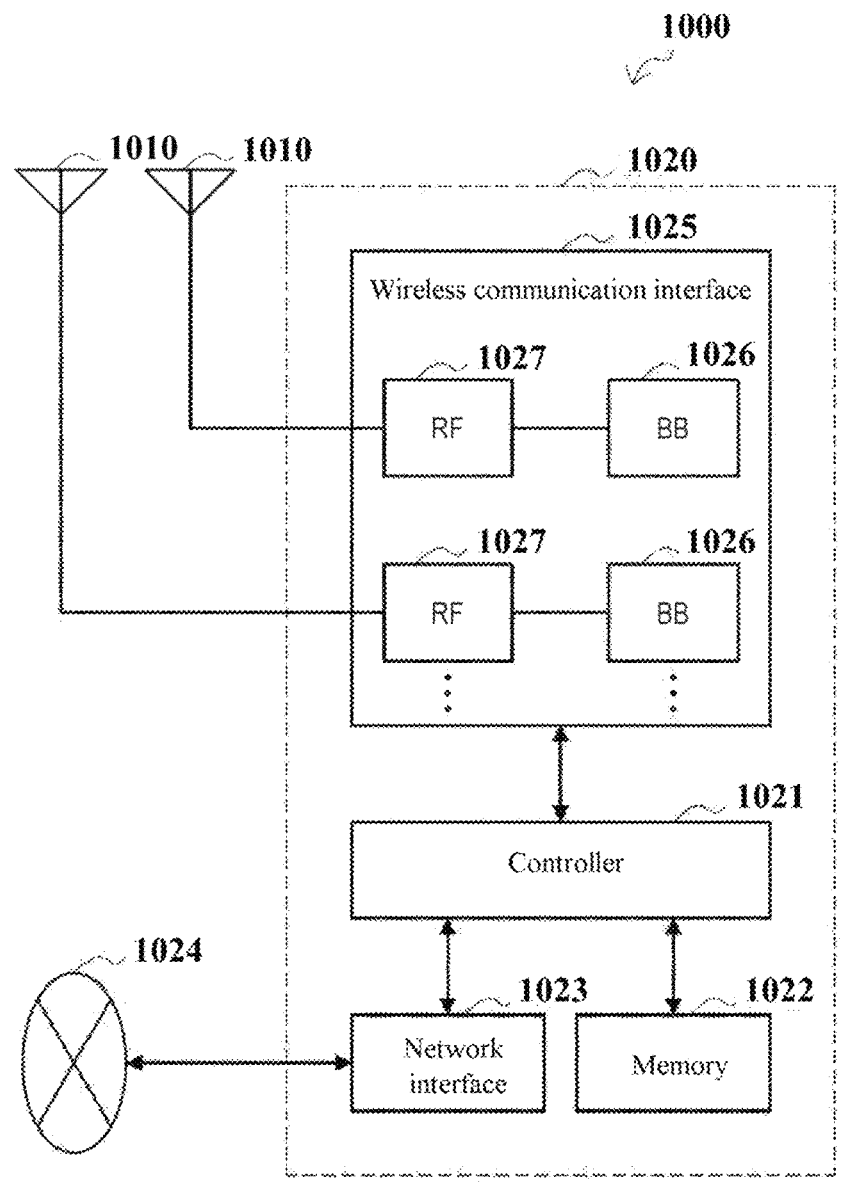
FIG. 10 is a block diagram showing a first schematic configuration example of an eNB (evolution Node Base Station) to which the present disclosure may be applied.

FIG. 10 is a block diagram showing a first schematic configuration example of an eNB to which the technology of the present disclosure may be applied. An eNB 1000 includes one or more antennas 1010 and a base station apparatus 1020. Each antenna 1010 and the base station apparatus 1020 may be connected to each other via an RF cable.

Each of the antennas 1010 includes a single or multiple antenna elements (such as multiple antenna elements included in an MIMO antenna), and is used for the base station apparatus 1020 to transmit and receive radio signals. As shown in FIG. 10, the eNB 1000 may include the multiple antennas 1010. For example, the multiple antennas 1010 may be compatible with multiple frequency bands used by the eNB 1000. Although FIG. 10 shows the example in which the eNB 1000 includes the multiple antennas 1010, the eNB 1000 may also include a single antenna 1010.

The base station apparatus 1020 includes a controller 1021, a memory 1022, a network interface 1023, and a wireless communication interface 1025.

The controller 1021 may be, for example, a CPU or a DSP, and operates various functions of a higher layer of the base station apparatus 1020. For example, the controller 1021 generates a data packet from data in signals processed by the wireless communication interface 1025, and transfers the generated packet via the network interface 1023. The controller 1021 may bundle data from multiple base band processors to generate the bundled packet, and transfer the generated bundled packet. The controller 1021 may have logical functions of performing control such as radio resource control, radio bearer control, mobility management, admission control and scheduling. The control may be performed in corporation with an eNB or a core network node in the vicinity. The memory 1022 includes a RAM and a ROM, and stores a program executed by the controller 1021, and various types of control data (such as a terminal list, transmission power data, and scheduling data).

The network interface 1023 is a communication interface for connecting the base station apparatus 1020 to a core network 1024. The controller 1021 may communicate with a core network node or another eNB via the network interface 1023. In that case, the eNB 1000, and the core network node or the other eNB may be connected to each other through a logical interface (such as an S1 interface and an X2 interface). The network interface 1023 may also be a wired communication interface or a wireless communication interface for wireless backhaul. If the network interface 1023 is a wireless communication interface, the network interface 1023 may use a higher frequency band for wireless communication than a frequency band used by the wireless communication interface 1025.

The wireless communication interface 1025 supports any cellular communication scheme (such as Long Term Evolution (LTE) and LTE-Advanced), and provides wireless connection to a terminal positioned in a cell of the eNB 1000 via the antenna 1010. The wireless communication interface 1025 may typically include, for example, a baseband (BB) processor 1026 and an RF circuit 1027. The BB processor 1026 may perform, for example, encoding/decoding, modulating/demodulating, and multiplexing/demultiplexing, and performs various types of signal processing of layers (such as L1, medium access control (MAC), wireless link control (RLC), and a packet data convergence protocol (PDCP)). The BB processor 1026 may have a part or all of the above-described logical functions instead of the controller 1021. The BB processor 1026 may be a memory that stores a communication control program, or a module that includes a processor and a related circuit configured to execute the program. Updating the program may allow the functions of the BB processor 1026 to be changed. The module may be a card or a blade that is inserted into a slot of the base station apparatus 1020. Alternatively, the module may also be a chip that is mounted on the card or the blade. Meanwhile, the RF circuit 1027 may include, for example, a mixer, a filter, and an amplifier, and transmits and receives wireless signals via the antenna 1010.

As shown in FIG. 10, the wireless communication interface 1025 may include the multiple BB processors 1026. For example, the multiple BB processors 1026 may be compatible with multiple frequency bands used by the eNB 1000. As shown in FIG. 10, the wireless communication interface 1025 may include the multiple RF circuits 1027. For example, the multiple RF circuits 1027 may be compatible with multiple antenna elements. Although FIG. 10 shows the example in which the wireless communication interface 1025 includes the multiple BB processors 1026 and the multiple RF circuits 1027, the wireless communication interface 1025 may also include a single BB processor 1026 or a single RF circuit 1027.

Figure 11:
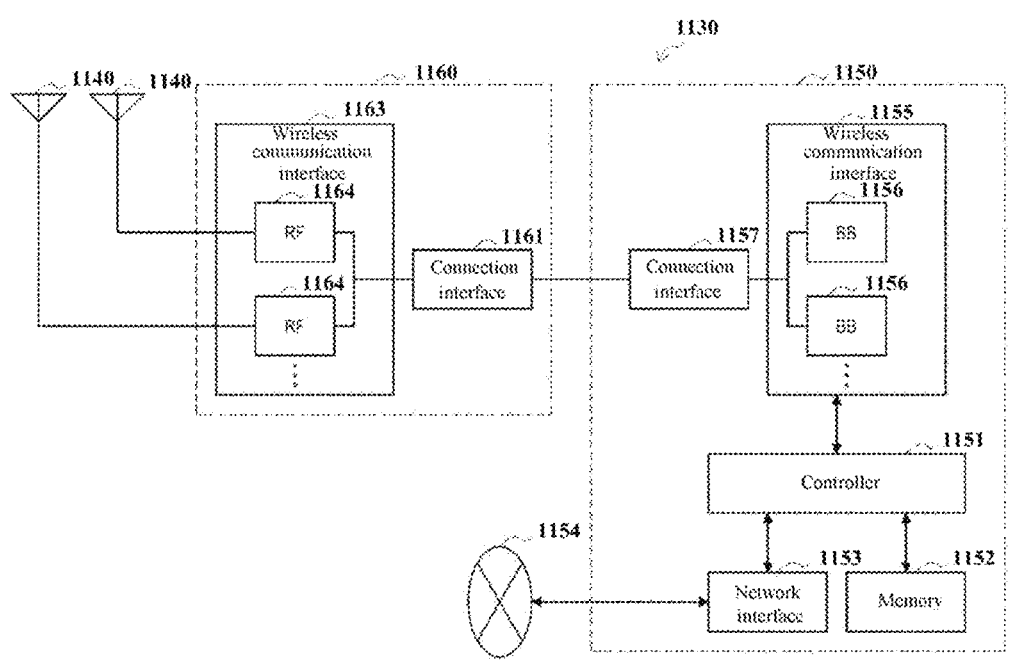
FIG. 11 is a block diagram showing a second schematic configuration example of an eNB to which the present disclosure may be applied.

FIG. 11 is a block diagram showing a second schematic configuration example of an eNB to which the technology of the present disclosure may be applied. An eNB 1130 includes one or more antennas 1140, a base station apparatus 1150, and an RRH 1160. Each antenna 1140 and the RRH 1160 may be connected to each other via an RF cable. The base station apparatus 1150 and the RRH 1160 may be connected to each other via a high speed line such as an optical fiber cable.

Each of the antennas 1140 includes a single or multiple antenna elements (such as multiple antenna elements included in an MIMO antenna), and is used for the RRH 1160 to transmit and receive radio signals. As shown in FIG. 11, the eNB 1130 may include the multiple antennas 1140. For example, the multiple antennas 1140 may be compatible with multiple frequency bands used by the eNB 1130. Although FIG. 11 shows the example in which the eNB 1130 includes the multiple antennas 1140, the eNB 1130 may also include a single antenna 1140.

The base station apparatus 1150 includes a controller 1151, a memory 1152, a network interface 1153, a wireless communication interface 1155, and a connection interface 1157. The controller 1151, the memory 1152, and the network interface 1153 are the same as the controller 1021, the memory 1022, and the network interface 1023 described with reference to FIG. 10.

The wireless communication interface 1155 supports any cellular communication scheme (such as LTE and LTE-Advanced), and provides wireless communication to a terminal positioned in a sector corresponding to the RRH 1160 via the RRH 1160 and the antenna 1140. The wireless communication interface 1155 may typically include, for example, a BB processor 1156. The BB processor 1156 is the same as the BB processor 1026 described with reference to FIG. 10, except the BB processor 1156 is connected to the RF circuit 1164 of the RRH 1160 via the connection interface 1157. As shown in FIG. 11, the wireless communication interface 1155 may include the multiple BB processors 1156. For example, the multiple BB processors 1156 may be compatible with multiple frequency bands used by the eNB 1130. Although FIG. 11 shows the example in which the wireless communication interface 1155 includes the multiple BB processors 1156, the wireless communication interface 1155 may also include a single BB processor 1156.

The connection interface 1157 is an interface for connecting the base station apparatus 1150 (wireless communication interface 1155) to the RRH 1160. The connection interface 1157 may also be a communication module for communication in the above-described high speed line that connects the base station apparatus 1150 (wireless communication interface 1155) to the RRH 1160.

The RRH 1160 includes a connection interface 1161 and a wireless communication interface 1163.

The connection interface 1161 is an interface for connecting the RRH 1160 (wireless communication interface 1163) to the base station apparatus 1150. The connection interface 1161 may also be a communication module for communication in the above-described high speed line.

The wireless communication interface 1163 transmits and receives wireless signals via the antenna 1140. The wireless communication interface 1163 may typically include, for example, the RF circuit 1164. The RF circuit 1164 may include, for example, a mixer, a filter, and an amplifier, and transmits and receives wireless signals via the antenna 1140. As shown in FIG. 11, the wireless communication interface 1163 may include multiple RF circuits 1164. For example, the multiple RF circuits 1164 may support multiple antenna elements. Although FIG. 11 shows the example in which the wireless communication interface 1163 includes the multiple RF circuits 1164, the wireless communication interface 1163 may also include a single RF circuit 1164.

In the eNB 1000 shown in FIG. 10 and the eNB 1130 shown in FIG. 11, the processing circuit 510 described with reference to FIG. 2 and the adjustment unit 511 thereof may be implemented by the controller 1021 and/or the controller 1151, and the communication unit 520 described with reference to FIG. 2 may be implemented by the wireless communication interface 1025 and the wireless communication interface 1155 and/or the wireless communication interface 1163. At least a part of the functions may also be implemented by the controller 1021 and the controller 1151. For example, the controller 1021 and/or the controller 1151 may implement the adjustment function by executing instructions stored in memories.

Figure 12:
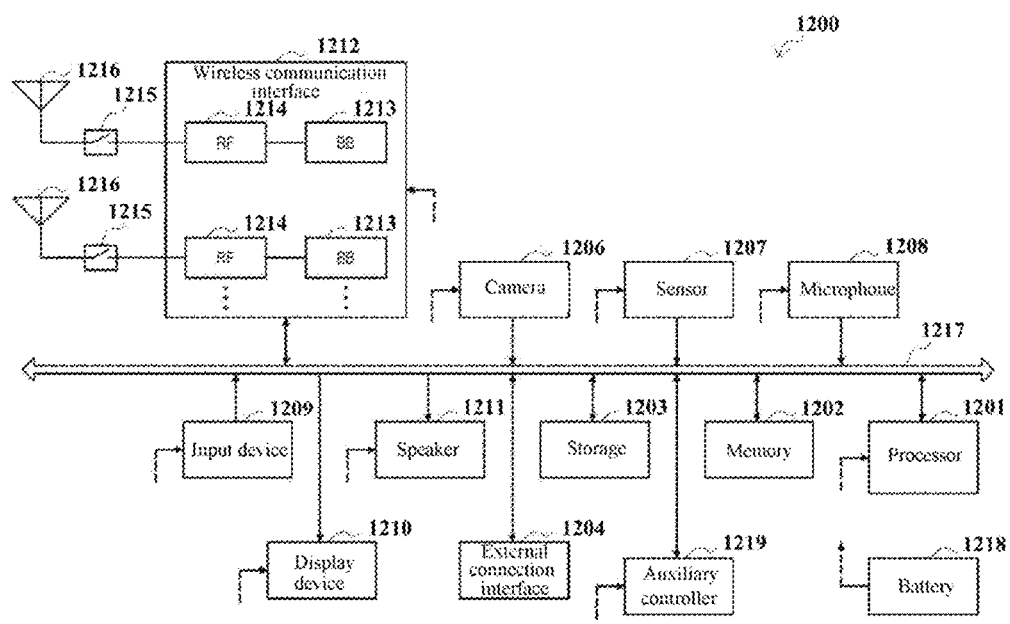
FIG. 12 is a block diagram showing a schematic configuration example of a smartphone to which the present disclosure may be applied.

FIG. 12 is a block diagram showing a schematic configuration example of a smartphone 1200 to which the technology of the present disclosure may be applied. The smartphone 1200 includes a processor 1201, a memory 1202, a storage 1203, an external connection interface 1204, a camera 1206, a sensor 1207, a microphone 1208, an input device 1209, a display device 1210, a speaker 1211, a wireless communication interface 1212, one or more antenna switches 1215, one or more antennas 1216, a bus 1217, a battery 1218, and an auxiliary controller 1219.

The processor 1201 may be, for example, a CPU or a system on a chip (SoC), and controls functions of an application layer and another layer of the smartphone 1200. The memory 1202 includes RAM and ROM, and stores a program that is executed by the processor 1201 and data. The storage 1203 may include a storage medium such as a semiconductor memory and a hard disk. The external connection interface 1204 is an interface for connecting an external device (such as a memory card and a universal serial bus (USB) device) to the smartphone 1200.

The camera 1206 includes an image sensor (such as a charge coupled device (CCD) and a complementary metal oxide semiconductor (CMOS)), and generates a captured image. The sensor 1207 may include a group of sensors such as a measurement sensor, a gyro sensor, a geomagnetic sensor and an acceleration sensor. The microphone 1208 converts sounds that are input to the smartphone 1200 to audio signals. The input device 1209 includes, for example, a touch sensor configured to detect touch onto a screen of the display device 1210, a keypad, a keyboard, a button or a switch, and receives an operation or an information input from a user. The display device 1210 includes a screen such as a liquid crystal display (LCD) and an organic light-emitting diode (OLED) display, and displays an output image of the smartphone 1200. The speaker 1211 converts audio signals outputted from the smartphone 1200 to sounds.

The wireless communication interface 1212 supports any cellular communication scheme such as LET and LTE-Advanced, and performs wireless communication. The wireless communication interface 1212 may typically include, for example, a BB processor 1213 and an RF circuit 1214. The BB processor 1213 may perform, for example, encoding/decoding, modulating/demodulating, and multiplexing/demultiplexing, and performs various types of signal processing for wireless communication. Meanwhile, the RF circuit 1214 may include, for example, a mixer, a filter and an amplifier, and transmits and receives wireless signals via the antenna 1216. The wireless communication interface 1212 may be a one chip module having the BB processor 1213 and the RF circuit 1214 integrated thereon. As shown in FIG. 12, the wireless communication interface 1212 may include the multiple BB processors 1213 and the multiple RF circuits 1214. Although FIG. 12 shows the example in which the wireless communication interface 1212 includes the multiple BB processors 1213 and the multiple RF circuits 1214, the wireless communication interface 1212 may also include a single BB processor 1213 or a single RF circuit 1214.

Furthermore, in addition to a cellular communication scheme, the wireless communication interface 1212 may support another type of wireless communication scheme such as a short-distance wireless communication scheme, a near field communication scheme, and a wireless local area network (LAN) scheme. In that case, the wireless communication interface 1212 may include the BB processor 1213 and the RF circuit 1214 for each wireless communication scheme.

Each of the antenna switches 1215 switches connection destinations of the antennas 1216 among multiple circuits (such as circuits for different wireless communication schemes) included in the wireless communication interface 1212.

Each of the antennas 1216 includes a single or multiple antenna elements (such as multiple antenna elements included in an MIMO antenna), and is used for the wireless communication interface 1212 to transmit and receive wireless signals. As shown in FIG. 12, the smartphone 1200 may include the multiple antennas 1216. Although FIG. 12 shows the example in which the smartphone 1200 includes the multiple antennas 1216, the smartphone 1200 may also include a single antenna 1216.

Furthermore, the smartphone 1200 may include the antenna 1216 for each wireless communication scheme. In that case, the antenna switches 1215 may be omitted from the configuration of the smartphone 1200.

The bus 1217 connects the processor 1201, the memory 1202, the storage 1203, the external connection interface 1204, the camera 1206, the sensor 1207, the microphone 1208, the input device 1209, the display device 1210, the speaker 1211, the wireless communication interface 1212, and the auxiliary controller 1219 to each other. The battery 1218 supplies power to blocks of the smartphone 1200 shown in FIG. 12 via feed lines, which are partially shown as dashed lines in the FIG. 12. The auxiliary controller 1219 operates a minimum necessary function of the smartphone 1200, for example, in a sleep mode.

In the smartphone 1200 shown in FIG. 12, the processing circuit 510 described with reference to FIG. 5 and the adjustment unit 511 thereof may be implemented by the processer 1201 or the auxiliary controller 1219, and the communication unit 520 described with reference to FIG. 5 may be implemented by the wireless communication interface 1212. At least a part of the functions may also be implemented by the processor 1201 or the auxiliary controller 1219. For example, the processor 1201 or the auxiliary controller 1219 can implement the adjustment function by executing instructions stored in the memory 1202 or the storage 1203.

Figure 13:
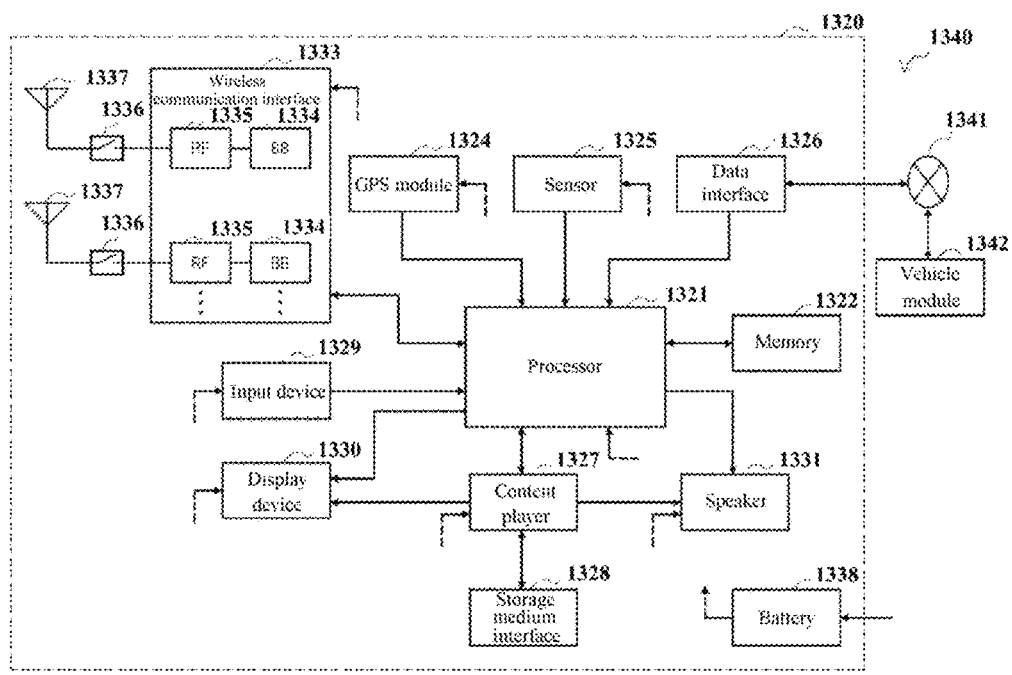
FIG. 13 is a block diagram showing a schematic configuration example of a car navigation apparatus to which the present disclosure may be applied.

FIG. 13 is a block diagram showing an example of a schematic configuration of a car navigation apparatus 1320 to which the technology of the present disclosure may be applied. The car navigation apparatus 1320 includes a processor 1321, a memory 1322, a global positioning system (GPS) module 1324, a sensor 1325, a data interface 1326, a content player 1327, a storage medium interface 1328, an input device 1329, a display device 1330, a speaker 1331, a wireless communication interface 1333, one or more antenna switches 1336, one or more antennas 1337, and a battery 1338.

The processor 1321 may be, for example, a CPU or a SoC, and controls a navigation function and another function of the car navigation apparatus 1320. The memory 1322 includes a RAM and a ROM, and stores a program executed by the processor 1321, and data.

The GPS module 1324 uses GPS signals received from a GPS satellite to determine a position (such as latitude, longitude, and altitude) of the car navigation apparatus 1320. The sensor 1325 may include a group of sensors such as a gyro sensor, a geomagnetic sensor, and an air pressure sensor. The data interface 1326 is connected to, for example, an in-vehicle network 1341 via a terminal that is not shown, and acquires data (such as vehicle speed data) generated by the vehicle.

The content player 1327 reproduces content stored in a storage medium (such as a CD and a DVD) that is inserted into the storage medium interface 1328. The input device 1329 includes, for example, a touch sensor configured to detect touch onto a screen of the display device 1330, a button or a switch, and receives an operation or information inputted from a user. The display device 1330 includes a screen such as a LCD or an OLED display, and displays an image of the navigation function or content that is reproduced. The speaker 1331 outputs sounds of the navigation function or the content that is reproduced.

The wireless communication interface 1333 supports any cellular communication scheme (such as LTE and LTE-Advanced), and performs wireless communication. The wireless communication interface 1333 may typically include, for example, a BB processor 1334 and an RF circuit 1335. The BB processor 1334 may perform, for example, encoding/decoding, modulating/demodulating, and multiplexing/demultiplexing, and performs various types of signal processing for wireless communication. Meanwhile, the RF circuit 1335 may include, for example, a mixer, a filter, and an amplifier, and transmits and receives wireless signals via the antenna 1337. The wireless communication interface 1333 may also be a one chip module that has the BB processor 1334 and the RF circuit 1335 integrated thereon. As shown in FIG. 13, the wireless communication interface 1333 may include the multiple BB processors 1334 and the multiple RF circuits 1335. Although FIG. 13 shows the example in which the wireless communication interface 1333 includes the multiple BB processors 1334 and the multiple RF circuits 1335, the wireless communication interface 1333 may also include a single BB processor 1334 or a single RF circuit 1335.

Furthermore, in addition to the cellular communication scheme, the wireless communication interface 1333 may support another type of wireless communication scheme such as a short-distance wireless communication scheme, a near field communication scheme, and a wireless LAN scheme. In that case, the wireless communication interface 1333 may include the BB processor 1334 and the RF circuit 1335 for each wireless communication scheme.

Each of the antenna switches 1336 switches connection destinations of the antennas 1337 among multiple circuits (such as circuits for different wireless communication schemes) included in the wireless communication interface 1333.

Each of the antennas 1337 includes a single or multiple antenna elements (such as multiple antenna elements included in an MIMO antenna), and is used for the wireless communication interface 1333 to transmit and receive wireless signals. As shown in FIG. 13, the car navigation apparatus 1320 may include the multiple antennas 1337. Although FIG. 13 shows the example in which the car navigation apparatus 1320 includes the multiple antennas 1337, the car navigation apparatus 1320 may also include a single antenna 1337.

Furthermore, the car navigation apparatus 1320 may include the antenna 1337 for each wireless communication scheme. In that case, the antenna switches 1336 may be omitted from the configuration of the car navigation apparatus 1320.

The battery 1338 supplies power to blocks of the car navigation apparatus 1320 shown in FIG. 13 via feed lines that are partially shown as dashed lines in the FIG. 13. The battery 1338 accumulates power supplied form the vehicle.

In the car navigation apparatus 1320 shown in FIG. 13, the processing circuit 610 described with reference to FIG. 6 and the estimation unit 611 thereof may be implemented by the processer 1321, and the communication unit 620 described with reference to FIG. 6 may be implemented by the wireless communication interface 1333. At least a part of the functions may also be implemented by the processor 1321. For example, the processor 1321 can implement the functions of determining positioning measurement auxiliary data, positioning measurement and generating positioning information by executing instructions stored in the memory 1322.

The technology of the present disclosure may also be implemented as an in-vehicle system (or a vehicle) 1340 including one or more blocks of the car navigation apparatus 1320, the in-vehicle network 1341 and a vehicle module 1342. The vehicle module 1342 generates vehicle data (such as a vehicle speed, an engine speed or failure information), and outputs the generated data to the in-vehicle network 1341.

In the system and method according to the present disclosure, the respective components or steps can be decomposed and/or recombined. These decompositions and/or recombination shall be regarded as equivalent solutions of the present disclosure. Moreover, steps for executing the above series of processing can naturally be executed chronologically in the sequence as described above, but is not limited thereto, and some of the steps can be performed in parallel or individually.

As is appreciated by those skilled in the art, various aspects of the present disclosure may be embodied as a system, method or device program product. Accordingly, aspects of the present disclosure may take the form of an entirely hardware embodiment or an embodiment including software that may all generally be referred to herein as a "circuit," "unit" or "system." Furthermore, aspects of the present disclosure may take the form of a device program product embodied in device readable medium(s) having device readable program code embodied therewith.

It should be noted that the various functions described herein may be implemented using instructions stored on a device readable storage medium, such as a non-signal storage device, that are executed by a processor. A storage device may be, for example, an electronic, magnetic, optical, electromagnetic, infrared, or semiconductor system, device, or apparatus, or any suitable combination thereof. More specific examples of a storage medium include: a portable computer magnetic disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of the present disclosure, a storage device is not a signal and "non-transitory" includes all mediums except a signal medium.

Program codes included on a storage medium may be transmitted using any appropriate medium, including but not limited to wireless, wired, optical cable, RF, etc., or any suitable combination thereof.

Program codes for carrying out operations may be written in any combination of one or more programming languages, or may be machine codes. The program codes may be executed entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the devices may be connected via other devices (for example, over the Internet provided by an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functions may be implemented at least in part by program instructions. These program instructions may be provided to a processor of a general-purpose information processing device, a dedicated information processing device or other programmable data processing device to produce a machine, such that the instructions executed via the processor of the device implement the specified functions/actions.

It should be noted that, while specific blocks are used in the figures and blocks are illustrated in a particular order, the examples are not intended to limit. In some cases, two or more modules may be combined, a block may be divided into two or more blocks, or certain blocks may be re-ordered or re-organized as appropriate, as the explicitly illustrated examples are used only for description and should not be construed as limiting.

Although the embodiments of the present disclosure have been described above in detail in connection with the drawings, it shall be appreciated that the embodiments as described above are merely illustrative rather than limitative for the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic device in a wireless communication system, comprising:
   one or more processing circuits configured to perform operations of:
   adjusting a length of a symbol in a self-contained subframe on a first subcarrier to align, within one transmission time interval (TTI) of a self-contained subframe on a second subcarrier, boundaries of downlink symbols and uplink symbols in the self-contained subframe on the second subcarrier with boundaries of symbols in the self-contained subframe on the first subcarrier; and
   causing a first symbol in the self-contained subframe on the first subcarrier after adjustment to have a greater length as compared with unadjusted symbols in the self-contained subframe on the first subcarrier after adjustment.

2. The electronic device according to claim 1, wherein the one or more processing circuits are configured to adjust the length of the symbol in the self-contained subframe on the first subcarrier by increasing or decreasing a length of a cyclic prefix (CP) of the symbol in the self-contained subframe on the first subcarrier.

3. The electronic device according to claim 1, wherein the one or more processing circuits are configured to adjust a length of a symbol which is adjacent to the first symbol in the self-contained subframe on the first subcarrier.

4. The electronic device according to claim 1, wherein before the one or more processing circuits adjust the length of the symbol in the self-contained subframe on the first subcarrier, a first symbol in the self-contained subframe on the first subcarrier has a first length, symbols other than the first symbol in the self-contained subframe on the first subcarrier have a second length, and the first length is greater than the second length.

5. The electronic device according to claim 4, wherein the one or more processing circuits are configured to adjust a length of only a second symbol in the self-contained subframe on the first subcarrier, and insert a guard period in a self-contained subframe on the first sub carrier.

6. The electronic device according to claim 1, wherein before the one or more processing circuits adjust the length of the symbol in the self-contained subframe on the first subcarrier, a first symbol in the self-contained subframe on the first subcarrier and a symbol in a guard period have a first length, symbols other than the first symbol in the self-contained subframe on the first subcarrier have a second length, and the first length is greater than the second length.

7. The electronic device according to claim 6, wherein the one or more processing circuits are configured to adjust the length of the symbol which is adjacent to the first symbol in the self-contained subframe on the first subcarrier, insert a guard period in a self-contained subframe on the first subcarrier, and adjust a length of a guard period in a self-contained subframe on the first subcarrier.

8. The electronic device according to claim 1, wherein the one or more processing circuits are configured to perform the operations in an unlicensed band or a licensed band.

9. The electronic device according to claim 1, wherein the self-contained subframe on the first subcarrier and the self-contained subframe on the second subcarrier have the same structure.

10. The electronic device according to claim 9, wherein each of the self-contained subframe on the first subcarrier and the self-contained subframe on the second subcarrier comprises a downlink part, an uplink part, and a guard period between the downlink part and the uplink part.

11. The electronic device according to claim 10, wherein symbols in the downlink part and the uplink part are orthogonal frequency division multiplexing (OFDM) symbols.

12. The electronic device according to claim 1, wherein a subcarrier spacing of the first subcarrier is $2^n$ times as long as a subcarrier spacing of the second subcarrier, where n is a natural number, and the boundaries of the downlink symbols and the uplink symbols in the self-contained subframe on the second subcarrier are aligned with boundaries of $2^n$ symbols in the self-contained subframe on the first subcarrier after adjustment.

13. The electronic device according to claim 1, wherein the wireless communication system is a 5G new radio (NR) system, the electronic device is one of a base station or a user equipment, and the electronic device further comprises a transceiver configured to perform wireless communication with the other one of the base station or the user equipment.

14. A user equipment in a wireless communication system, comprising:
   one or more processing circuits configured to perform operations of:

acquiring downlink signaling from a base station in the wireless communication system; and acquiring, from the downlink signaling, a length of a symbol in a self-contained sub-frame on a first subcarrier after adjustment, wherein, within one transmission time interval (TTI) of a self-contained subframe on a second subcarrier:

boundaries of downlink symbols and uplink symbols in the self-contained subframe on the second subcarrier are aligned with boundaries of the symbols in the self-contained subframe on the first subcarrier, and as compared with unadjusted symbols in the self-contained subframe on the first subcarrier after adjustment, a first symbol in the self-contained subframe on the first subcarrier after adjustment has a greater length.

15. A method for performing wireless communication in a wireless communication system, comprising:

adjusting a length of a symbol in a self-contained subframe on a first subcarrier to align, within one transmission time interval (TTI) of a self-contained subframe on a second subcarrier, boundaries of downlink symbols and uplink symbols in the self-contained subframe on the second subcarrier with boundaries of symbols in the self-contained subframe on the first subcarrier; and causing a first symbol in the self-contained subframe on the first subcarrier after adjustment to have a greater length as compared with unadjusted symbols in the self-contained subframe on the first subcarrier after adjustment.

16. The method according to claim 15, comprising adjusting the length of the symbol in the self-contained subframe on the first subcarrier by increasing or decreasing a length of a cyclic prefix (CP) of the symbol in the self-contained subframe on the first subcarrier.

17. The method according to claim 15, comprising adjusting a length of a symbol which is adjacent to the first symbol in the self-contained subframe on the first subcarrier.

18. The method according to claim 15, wherein before the length of the symbol in the self-contained subframe on the first subcarrier is adjusted, a first symbol in the self-contained subframe on the first subcarrier has a first length, symbols other than the first symbol in the self-contained subframe on the first subcarrier have a second length, and the first length is greater than the second length.

19. The method according to claim 18, comprising adjusting a length of only a second symbol in the self-contained subframe on the first subcarrier, and inserting a guard period in a self-contained subframe on the first subcarrier.

20. A method for performing wireless communication in a wireless communication system, comprising:

acquiring downlink signaling from a base station in the wireless communication system; and acquiring, from the downlink signaling, a length of a symbol in a self-contained sub-frame on a first subcarrier after adjustment, wherein, within one transmission time interval (TTI) of a self-contained subframe on a second subcarrier:

boundaries of downlink symbols and uplink symbols in the self-contained subframe on the second subcarrier are aligned with boundaries of the symbols in the self-contained subframe on the first subcarrier, and as compared with unadjusted symbols in the self-contained subframe on the first subcarrier after adjustment, a first symbol in the self-contained subframe on the first subcarrier after adjustment has a greater length.

* * * * *